United States Patent
Ahokas et al.

(10) Patent No.: US 10,776,523 B2
(45) Date of Patent: Sep. 15, 2020

(54) ACCESSING A PASSENGER TRANSPORTATION DEVICE CONTROL MEANS

(71) Applicant: Kone Corporation, Helsinki (FI)

(72) Inventors: Sampo Ahokas, Helsinki (FI); Antti Hovi, Helsinki (FI); Ferenc Staengler, Hyvinkaa (FI)

(73) Assignee: Kone Corporation, Helsinki (FI)

(*) Notice: Subject to any disclaimer, the term of this patent is extended or adjusted under 35 U.S.C. 154(b) by 161 days.

(21) Appl. No.: 15/933,586

(22) Filed: Mar. 23, 2018

(65) Prior Publication Data

US 2018/0211066 A1    Jul. 26, 2018

Related U.S. Application Data

(63) Continuation of application No. PCT/EP2015/072789, filed on Oct. 2, 2015.

(51) Int. Cl.
G06F 21/00 (2013.01)
G06F 21/73 (2013.01)
(Continued)

(52) U.S. Cl.
CPC .............. *G06F 21/73* (2013.01); *G06F 11/25* (2013.01); *G06F 11/2736* (2013.01);
(Continued)

(58) Field of Classification Search
CPC ........ G06F 21/73; G06F 21/57; G06F 21/575; G06F 2221/034; G06F 11/2736; G06F 11/25
See application file for complete search history.

(56) References Cited

U.S. PATENT DOCUMENTS

2007/0080026 A1    4/2007  Tschuemperlin
2015/0166303 A1*   6/2015  Puranen ............... B66B 13/22
                                              187/277
(Continued)

FOREIGN PATENT DOCUMENTS

EP    2784015 A1    10/2014
GB    2477774 A     8/2011

OTHER PUBLICATIONS

International Search Report PCT/ISA/210 for International Application No. PCT/EP2015/072789 dated Mar. 23, 2016.
(Continued)

*Primary Examiner* — Joseph P Hirl
*Assistant Examiner* — Chi D Nguy
(74) *Attorney, Agent, or Firm* — Harness, Dickey and Pierce, P.L.C.

(57) ABSTRACT

The invention refers to a method for accessing an passenger transportation device control means comprising several separated printed circuit boards (PCB), whereby each of these PCBs comprises a unique identifier (ID), and in which method the passenger transportation device control means comprise a matching table which is used by the passenger transportation device control means to perform a matching test to check the identifier of at least two of the PCBs and to put the passenger transportation device control means into normal operation only if their IDs match the IDs of the matching table. A service technician connects via a key to the passenger transportation device control means, which key enables the service technician to set the passenger transportation device control means into a fault finding mode, in which fault finding mode the passenger transportation device control means are initiated to skip the matching test before getting into operation, whereby the fault finding mode is terminated at the latest when the service technician (Continued)

terminates the key-based connection with the passenger transportation device control means.

14 Claims, 2 Drawing Sheets

(51) Int. Cl.
    *G06F 21/57*      (2013.01)
    *G06F 11/25*      (2006.01)
    *G06F 11/273*      (2006.01)

(52) U.S. Cl.
    CPC ............ *G06F 21/57* (2013.01); *G06F 21/575* (2013.01); *G06F 2221/034* (2013.01)

(56) References Cited

U.S. PATENT DOCUMENTS

| | | | |
|---|---|---|---|
| 2015/0222604 A1* | 8/2015 | Ylonen | H04L 63/062 713/171 |
| 2018/0141780 A1* | 5/2018 | Franck | B66B 3/00 |
| 2018/0157482 A1* | 6/2018 | Kirchhoff | B66B 1/34 |

OTHER PUBLICATIONS

Written Opinion of the International Searching Authority PCT/ISA/237 for International Application No. PCT/EP2015/072789 dated Mar. 23, 2016.

\* cited by examiner

ACCESSING A PASSENGER TRANSPORTATION DEVICE CONTROL MEANS

This application is a continuation of PCT International Application No. PCT/EP2015/072789 which has an International filing date of Oct. 2, 2015, the entire contents of which are incorporated herein by reference.

BACKGROUND OF THE INVENTION

The present invention relates to a method for accessing a passenger transportation device control means consisting of several printed circuit boards (PCBs) whereby each of these PCBs comprises a unique identifier (ID) and in which method the passenger transportation device control means comprise a matching table which is used by the passenger transportation device control means to perform a matching test to check the identifier of at least two PCBs, particularly of all PCBs in the control means and to put the passenger transportation device control means into normal operation only if the PCBs IDs match the matching table. Such a method and system are known from EP 2 784 015 A1.

One problem of this method comes up if a service technician tries to mount a PCB to the passenger transportation device control means which is not comprised in the matching table. These circumstances may happen if the service technician only wants to perform tests, e.g. to check which of the PCBs in the elevator control malfunctions or if he is not able to get a matching replacement part in time and is thus forced to insert a similar part into the passenger transportation device control means which of course does not match to the IDs listed in the matching table. The known device provided on that behalf an updating means to insert the ID of a replacement into the matching table. However, this method is quite complicated and needs the entering of a separate update procedure.

SUMMARY OF THE INVENTION

It is therefore object of the invention to facilitate the use or the replacement of replacement parts in a transportation device control means which do not fit to a matching table comprised in said control means.

This object is solved with a method according to claim 1 and with a passenger transportation system according to claim 10. Preferred embodiments of the invention are subject matter of the dependent claims. Advantageous embodiments are also disclosed in the description and drawings.

According to the present invention, a key is entered to the passenger transportation device control means, e.g. via a service technician of the elevator/escalator or maintenance company. It is hereby to be mentioned that the passenger transportation device may be an elevator, an elevator group, an escalator, a moving ramp or the like or any combinations of these different types of passenger conveyors. The key may be a hardware component as e.g. a service tool as e.g. a laptop or flash storage stick or a digital key, e.g. a code, which has to be input into a terminal of the passenger transportation device control means or in a service laptop. Thus, the service technician does not necessarily need his own service tool if the passenger transportation device control means comprises the necessary terminal components as keyboard and monitor. The key enables the passenger transportation device control means to be set into a fault finding mode, in which fault finding mode the passenger transportation device control means are initiated to skip the matching test before starting its operation. The fault finding mode is terminated at the latest when the key-based connection with the passenger transportation device control means is terminated. It is in this connection possible that this termination of the fault finding mode happens when the passenger transportation device control means starts operation after skipping the matching test. Further, the fault finding mode may be terminated manually by a corresponding control action by the service technician. It is of course possible to automatically terminate the fault finding mode when the key is terminated, e.g. the service tool is disconnected from the passenger transportation device control means or the service technician has logged off on the terminal of the passenger transportation device control means.

The invention therefore provides with this fault finding mode a starting route which bypasses the matching test in contrast to the regular starting procedure. Via this means, the passenger transportation device can be put into service with a PCB or more common with an elevator component which is not registered in the matching table. The advantage of this solution is that the matching table has not to be updated which was the case with the previous known method. Therefore, the service technician may perform test runs of the passenger transportation device, e.g. the elevator, to check which of the different printed circuit boards or elevator components is malfunctioning. This is not possible with the known method which always requires the updating of the matching table with the new replacement part to allow the passenger transportation device to work.

Following terms are described/used as a synonym: transportation device control means=control means; elevator group control=one embodiment of a transportation device control means; transportation system=global or regional number of transportation devices with corresponding equipment serviced by a transportation device company, e.g. an elevator builder; PCB=printed circuit board=electronic elevator component=plug-in module of an elevator group control; ID=identity key, regularly digital; service tool=hardware tool to be connected with transportation device control means, e.g. flash storage, mobile phone or service laptop; transportation device=passenger transportation device; key=connection of service tool and/or input of an access code and/or deactivation command for the matching test.

In a preferred embodiment of the invention, a service tool as e.g. a laptop is used which can be connected with the passenger transportation device control means, particularly by a plug-in connection, whereby the start of the fault finding mode is only possible if the service tool is connected to the passenger transportation device control means. The skipping of the matching test necessitates therefore the connection of the service tool which ensures that the skipping of the matching test is not performed by unauthorized persons.

In a preferred embodiment of the invention, the fault finding mode is automatically started when the service tool is connected with the passenger transportation device control means. Thus, with the plug-in of the service tool, an internal ID of the service tool could be forwarded to the passenger transportation device control means which is read and checked by an access circuit of the control means and after passing enables the control means to skip the matching test when starting its operation and (therewith the operation of the complete passenger transportation device, e.g. elevator group). The advantage of this embodiment is that no complicated manual inputs have to be performed by the service technician to start the fault finding mode of the passenger transportation device control means.

In a preferred embodiment of the invention, the fault finding mode is automatically terminated—if not already terminated beforehand—when the service tool is disconnected from the passenger transportation device control means. Also with this feature, a misuse of the fault finding mode of the passenger transportation device control means is ensured so that a service technician with his service tool is necessary to skip the matching test in the starting procedure of the passenger transportation device control means.

In a preferred embodiment of the invention, the service tool is connected with the passenger transportation device control means by plugging-in the plug of the service tool into an interface of the passenger transportation device control means. The connection and the skipping of the matching test can therefore be initiated by simply plugging the service tool into an interface of the passenger transportation device control means. The service tool may in this case only be a flash storage with an ID so that no manual inputs have to be performed by the service technician.

The forwarding of the key to the transportation device may not only result in the skipping of the matching test but also in the starting of a test mode, wherein different components of the control means may be checked. This enables smooth testing of the electronic components of the transportation device.

As already mentioned the key can be inputted to the control means automatically by plugging in the service tool and/or by typing a command and/or an access code into a terminal or other input means of the control means or into a keyboard/buttons of the service tool.

In a preferred embodiment of the inventive method, the service technician is able during the fault finding mode to change the matching table of the passenger transportation device control means via the key to include a different ID of a previously not matching PCB into the matching table. This method step enables the service technician to have the passenger transportation device work with the replacement part e.g. until he receives from a central replacement part distribution centre a replacement part with the correct ID. In a preferred embodiment of this step, this change of the ID can be timely limited so that with the next plug-in of the service tool, the changed ID is abandoned and the previous IDs of the PCBs are re-activated. This allows the use of replacement parts only for a transient period until an original spare part with the correct ID is delivered. This solution respects the intimal pairing over the long run and thus improves the integrity of the transportation device.

In this connection, the term individual ID of the PCBs shall be described. Individual ID can mean that the ID of the corresponding PCB is really unique or it can mean that all different PCBs of one passenger transportation device comprises the same ID which is unique for said transportation device which also leads to the fact that each PCB of a certain type only once has this particular ID which makes this ID unique for said type of PCB. In both cases, each PCB of a certain type only exists once with said ID.

In a preferred embodiment of the invention, the service technician has a unique access identifier and the start of the fault finding mode is possible only after inputting the unique access identifier into the passenger transportation device control means. This input can be performed automatically when the service tool is plugged into an interface of the passenger transportation device control means or it can be input manually via a keyboard of the service tool or of a terminal of the passenger transportation device control means. This measure helps to prevent access to safety relevant parts of the transportation device control means, e.g. elevator control by unauthorized persons.

In a preferred embodiment, the key includes a unique access code which is checked by an access circuit of the passenger transportation device control means. Also this feature ensures that only certain predetermined service technicians have access to the safety relevant parts of the passenger transportation device control means.

The inventive method allows the connection, e.g. plugging of a replacement PCB to the passenger transportation device control means which replacement PCB does not match the matching table. Via this measure, it is ensured that the service technician can at least intermediately replace a faulty PCB with a PCB having an ID which does not correspond to the matching table. Of course, the non-matching replacement part has to be replaced by a correct replacement part with the next start of the passenger transportation device. Anyway, during this period, a correct replacement part can be ordered and delivered from a central replacement part delivery centre of the passenger transportation device builder.

The invention also refers to a passenger transportation system comprising multiple separate passenger transportation devices in different locations as e.g. elevators, elevator groups, elevator multi-groups, escalators, moving ramps, moving sidewalks or escalator groups or mixed groups of these different passenger conveyors. Each passenger transportation device comprises a passenger transportation device control means for controlling at least one, preferably at least two passenger conveyors. The passenger transportation device control means comprises at least two separate PCBs or elevator components with own unique identifiers to be connected usually by per se known plug-in connections. The passenger transportation device control means comprises a matching unit with a matching table, which matching unit is configured to perform a matching test wherein the unique identifiers of the PCBs are compared to with a matching table and the passenger transportation device control means is allowed to be put into normal operation only when the unique identifiers of the at least two PCBs are listed in said matching table. In contrast thereto, the control means is not allowed to start normal operation when at least one PCB has a mismatch with its ID. Of course, in this case a service mode might be run by the control means which allows some settings within a defined range but no normal operation of the transportation device.

In this connection, the matching table is preferably a part of a memory comprised in the passenger transportation device control means. It may be located in a protection circuit located on the main board of the control means. The passenger transportation device control means further comprises preferably an access circuit which is being connectable by a service tool of the passenger transportation device system as e.g. a hardware component like a flash storage or a laptop or different electronic devices with I/O characteristics as e.g. a smartphone. The access circuit my either only detect the connection of the service tool or also require an access code and/or deactivation command being transmitted. Both can act as the key to be inserted into the control means.

The passenger transportation device further comprises at least one service tool of the above-mentioned type which is connectable to said access circuit. The access circuit is configured to deactivate the matching unit at least as long as the service tool is connected to the access circuit. In summary the invention allows the bypassing of the activity of the matching unit by the connection of a service tool to the passenger transportation device control means. The advantages and the objects of this device are already described above in connection with the inventive method.

Preferably, the service tool comprises a unique access identifier which is checked by the access circuit before deactivating the matching unit for the current start of the control means.

This embodiment of the passenger transportation system allows an easy handling of the service tool and ensures maximum safety against access from unauthorized persons.

In a preferred embodiment of the invention, the service tool is configured to edit the content of the matching unit, particularly its matching table as to add an ID of a replacement part which was previously not listed in the matching unit. By this means, the passenger transportation device control means can be modified as to work with a different replacement part which was previously not listed in the matching table. Of course, the matching unit may comprise a clock circuit which resets the changed ID to the previous ID with the next start of the passenger transportation device control means. With this modification it is ensured that with the next start of the passenger transportation device, a correct replacement part with the correct original ID has to be inserted. Therefore, the passenger transportation device can be operated with a different replacement part only for an intermitting period to cover the period until a correct replacement part is delivered.

The passenger transportation device comprises in a preferred embodiment at least two of the following components: a main board, an elevator logic controller board, a main safety circuit board, a car cross connection board, an I/O board, a low end group controller board, an alarm phone and monitoring board, a floor control board and a drive control board. The elevator logic controller board can also be designated as a main board or a separate main board with interfaces for the installation of all the previous mentioned PCBs can be provided.

In any case, two of these at least two PCBs are the main board, and at least one of the elevator logic controller board (short: main board) and the main safety circuit board which build the base for the operation of a passenger transportation device control means. Usually needed is the main board, the main safety circuit board, the car cross connection board, the alarm phone & monitoring board and the low end group controller board. The drive control board is usually placed in the vicinity of the electronic elevator drive because of the high current connections.

In a preferred embodiment of the invention, the service tool comprises a plug-in connection to an interface of the passenger transportation device control means via which an easy connection of the service tool to the passenger transportation device control means is possible. Via this plug-in connection, the fault finding mode can for example be automatically entered as to start without the matching test.

It is obvious for the skilled person that the above-mentioned embodiments of the invention can be combined arbitrarily. Furthermore, single elevator components can be provided multiple or can be integrated. The function of several PCBs can be integrated in one PCB. The passenger transportation system may comprise a lot of elevators, elevator groups, multi-groups, escalators and mixed passenger transportation system over a certain region or even globally. Usually, each service technician performing repairs or maintenance at one of these passenger transportation devices has a service tool of his own. Also, these service tools may have different unique IDs or identical IDs which are then of course also stored in a part, particularly in a safety relating part of the passenger transportation device, as e.g. in the protection circuit on the main board of the elevator group control.

BRIEF DESCRIPTION OF THE DRAWINGS

The invention is now described via an example in connection with the enclosed drawings. In this drawing

DESCRIPTION OF THE PREFERRED EMBODIMENTS

Figure 1:
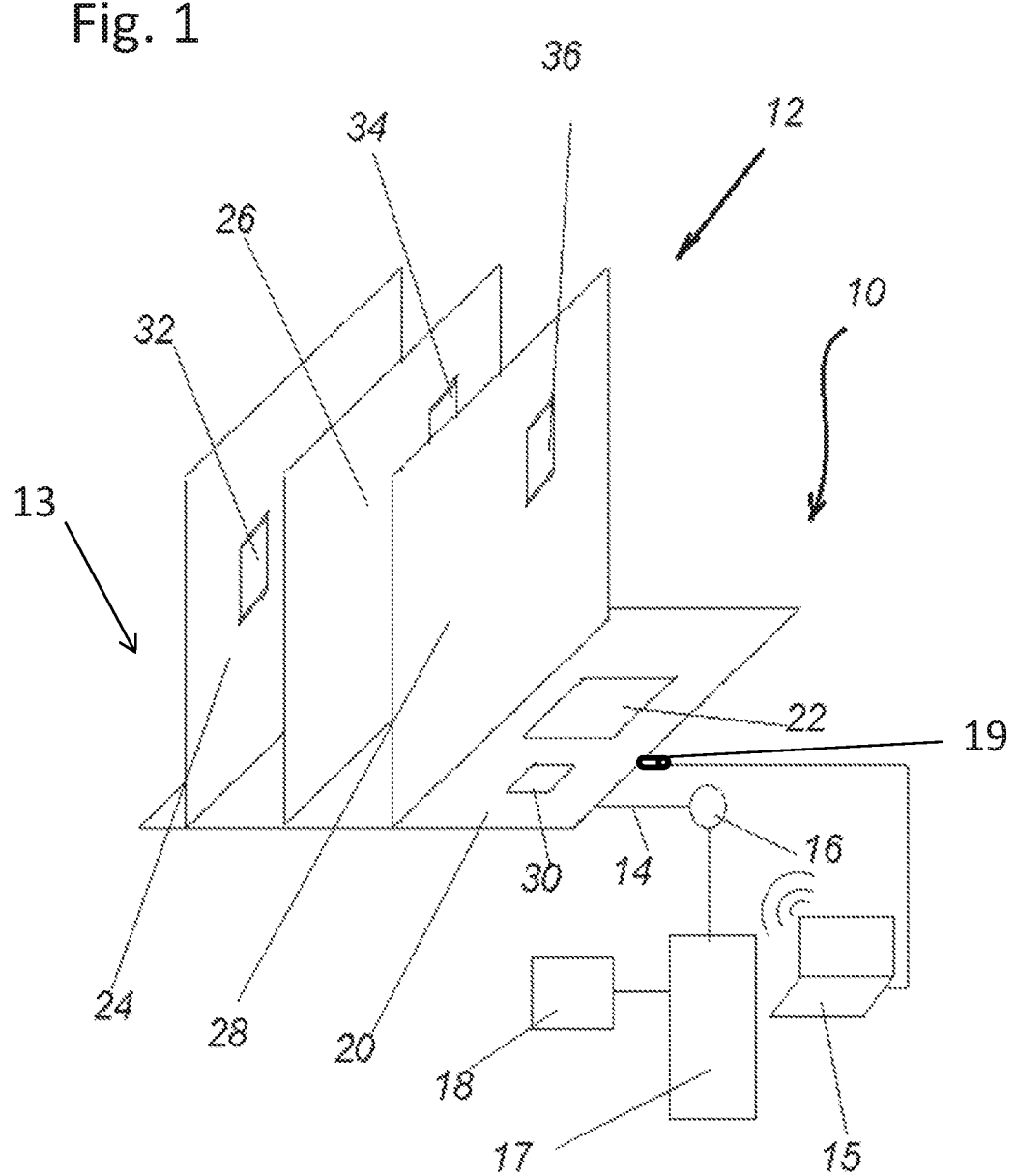
FIG. 1 shows a schematic perspective view of an elevator system having a passenger transportation device control means with several PCBs and a service tool embodied as a laptop, FIG. 2 a flow-chart of the starting procedure of a passenger transportation device control means.

FIG. 1 shows an elevator system 10 as an example of a passenger transportation device system. The elevator system 10 comprises at least one elevator group 12 from which only the electronic components PCBs) of the common elevator group control 13 are shown as an embodiment of a transportation device control means. The elevator group control 13 comprises a main board 20 which is connectable via a plug-in connection 19 to a service tool embodied as laptop 15. Furthermore, the main board 20 has optionally a LAN connection 14 to an internet node 16 which also may be connected to a maintenance server 17 and a connected memory 18 of the elevator or maintenance company serving the elevator group 12. The main board (or an elevator logic controller board) 20 comprises a CPU 22 and a protection circuit 30 comprising a matching unit with a matching table and an access circuit. Three further printed circuit boards (PCBs) 24, 26, 28 are plugged via per se known plug-in connections to the main board 20, e.g. a car cross connection board 24 with its CPU 32, a low end group controller board 26 with its CPU 34, and main safety circuit board 28 with its CPU 36. The different printed circuit boards 24, 26, 28 comprise unique identifiers which are stored e.g. in a memory part of the CPU 32, 34, 36, 22 of the corresponding PCBs 24, 26, 28. The protection circuit 30 on the main board 20 comprises the matching unit with a matching table and an access circuit which detects the plugging of a laptop 15 of a service technician to the plug-in connection 19 of the main board 20 and/or checks a an access code of the service technician to enter the control means configuration.

With every start of the elevator control 13, the matching unit in the protection circuit 30 performs a check of the unique IDs of the main board stored in the CPU 22 of the main board and the connected PCBs 24, 26, 28 stored in the corresponding CPUs 32, 34, 36 and compares them with IDs stored in its matching table and only allows the start of the elevator control 13 in normal operating mode (which allows the normal operation and use of the elevator) if the comparison is positive. Anyway, if the access circuit detects the plugging of the service tool, i.e. laptop 15, it automatically starts a fault finding mode in which the matching test of the matching unit in the protection circuit 30 is skipped so that the elevator control 13 is started without the matching test. Thus, the elevator control can be started with impaired PCBs for testing purposes or as an intermediate solution until a correct replacement part (PCB) with a correct matching ID is delivered from a replacement part delivery centre of the elevator company.

Figure 2:
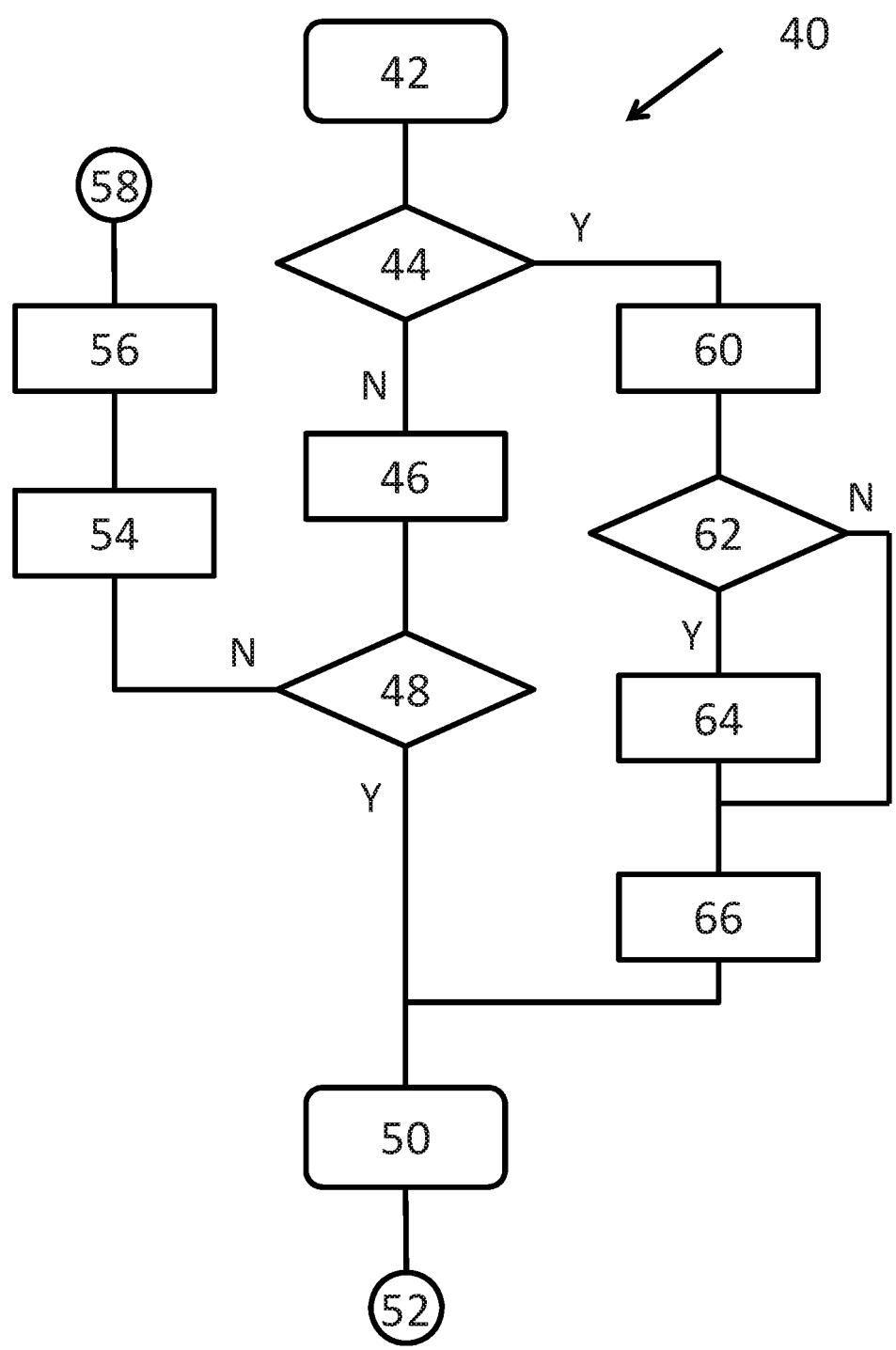

The starting procedure of the elevator control 13 is shown in the flow diagram 40 of FIG. 2. The starting-up (pushing the power-button) of the elevator control in step 42 indicates the start of the starting procedure. In the deciding step 44 it is checked whether a service tool 15 is connected to the plug-in connection 19 or not. If not, the matching test is going to be performed. On this behalf the protection circuit 30 reads in step 46 all IDs of the connected PCBs and of the main board CPU. In deciding step 48 it is checked whether the IDs of the connected PCBs are listed in the matching table of the protection circuit. If this matching test is positive, the elevator control 13 is allowed to start up in method step 50 whereafter the starting procedure ends in step 52. This is the normal starting procedure of the elevator control 13.

If the matching test 48 in the matching unit of the protection circuit 30 reveals that at least one of the connected PCBs and/or the main board 20 do/does not correspond to the IDs of the matching table, the procedure proceeds to step 54 wherein the service technician is notified of a non-matching component has been found and a service mode of the elevator control is started in step 56, which does not allow the normal operation of the elevators. Here the starting procedure ends in step 58.

If however in the first deciding field 44 it is detected that a service tool 15 is plugged in to the plug-in connection 19 of the main board 20, the elevator control is started in the fault finding mode in step 60. The Fault finding mode can be activated automatically when the service tool is plugged in or manually by typing in a command and/or an access code into a input means of the control means or of the service tool.

In an optional deciding step 62, the service technician is asked whether he wants to change the ID of a connected PCB. If the service technician inputs Yes, he is prompted in field 64 to input the new ID of a connected replacement PCB, which is then added to the matching table as at least intermediate ID. If not, the procedure proceeds to field 66 where the fault finding mode is ended and the method proceeds further to step 50 where the elevator control is started. Therefore, by using the right branch of steps 60 to 66, the elevator is started without the matching test. Accordingly, the elevator system handles the checking of the use of original parts in an elevator or other passenger transportation device in a flexible manner. Thus, even a replacement PCB having a non-matching ID may be used at least as an interim solution over a limited transient period.

The invention is not restricted to the described embodiments but may be varied within the scope of the appended patent claims.

LIST OF REFERENCE NUMBERS

10 elevator system
12 elevator control device
13 elevator group control (passenger transportation device control means)
14 LAN connection
15 laptop (service tool)
16 internet node
17 maintenance server
18 memory of maintenance server
20 main board
22 main CPU (logic controller) with unique ID
24 car cross connection board
26 low end group controller board
28 main safety circuit board
30 protection circuit with matching unit and access circuit
32 PCB CPU with unique ID
34 PCB CPU with unique ID
36 PCB CPU with unique ID
40 start-up procedure of elevator group control
42 switching on the power button
44 Checking whether plug-in connection of service tool (key entered?)
46 reading IDs from PCBs and from matching table
48 performing matching test
50 start elevator group control
52 end
54 notice of mismatching PCB
56 starting service mode
58 end
60 start fault finding mode
62 change ID in matching table?
64 enter new intermittent ID to matching table
66 terminate fault finding mode

The invention claimed is:

1. A method for accessing a passenger transportation device controller that includes printed circuit boards (PCBs) each having a unique identifier (ID), the method comprising:
    performing, using a matching table, a matching test to check the unique ID of the PCBs;
    setting the passenger transportation device controller into normal operation only if the matching test indicates that the unique IDs are stored in the matching table;
    setting, in response to receipt of a key-based connection, the passenger transportation device controller into a fault finding mode such that, in the fault finding mode, the passenger transportation device controller skips the matching test before starting operation;
    authorizing, while in the fault finding mode, an unrecognized PCB to connect to the passenger transportation device controller, the unrecognized PCB being a PCB having a unique ID associated therewith which is not present in the matching table; and
    terminating the fault finding mode in response to disconnection of the key-based connection to the passenger transportation device controller.

2. The method according to claim 1, further comprising:
    detecting a service tool connected to the passenger transportation device controller via an interface, wherein
    the setting sets the passenger transportation device controller into the fault finding mode only if the service tool is connected.

3. The method according to claim 2, wherein the setting comprises:
    automatically starting the fault finding mode when the service tool is connected.

4. The method according to claim 2, wherein the terminating comprises:
    automatically terminating the fault finding mode when the service tool is disconnected.

5. The method according to claim 2, wherein the detecting detects the service tool when the service tool is connected by plugging a plug of the service tool into the interface of the passenger transportation device controller.

6. The method according to claim 1, further comprising:
    updating, during the fault finding mode, the matching table to include the unique ID of a replacement or testing PCB.

7. The method according to claim 1, wherein the setting the passenger transportation device controller into the fault finding mode comprises:
    receiving a unique access identifier identifying a service technician; and
    checking the unique access identifier before setting passenger transport system to the fault finding mode.

8. The method according to claim 1, wherein the key-based connection includes a unique access code, and the method further comprises:

checking, via an access circuit, the unique access code.

9. The method according to claim 1, further comprising:

connecting, while in the fault finding mode, the unrecognized PCB to the passenger transportation device controller.

10. A passenger transportation device controller configured to control at least one passenger conveyor, the passenger transportation device controller comprising:

an interface configured to provide a key-based connection to the passenger transportation device controller;

a memory storing a matching table including unique identifiers (IDs) of printed circuit boards (PCBs) connected to the passenger transportation device controller; and circuitry configured to, perform, using the matching table, a matching test to check the unique ID of the PCBs set the passenger transportation device controller into normal operation only if the matching test indicates that the unique IDs are stored in the matching table setting, in response to receipt of the key-based connection, passenger transportation device controller into a fault finding mode such that, in the fault finding mode, the passenger transportation device controller skips the matching test before starting operation;

authorizing, while in the fault finding mode, an unrecognized PCB to connect to the passenger transportation device controller, the unrecognized PCB being a PCB having a unique ID associated therewith which is not present in the matching table; and terminating the fault finding mode in response to disconnection of the key-based connection to the passenger transportation device controller.

11. The passenger transportation device controller according to claim 10, wherein the circuitry is configured to, detecting a service tool connected to the passenger transportation device controller via the interface, the service tool including a unique access identifier, and checking the unique access identifier of the service tool before setting passenger transport system to the fault finding mode.

12. The passenger transportation device controller according to claim 11, wherein the circuitry is configured to, edit the matching table in response to a request from a service technician via the service tool.

13. The passenger transportation device controller according to claim 10, wherein the PCBs comprise at least two: an elevator logic controller board (main board), a main safety circuit board, a car cross connection board, an I/O board, a low end group controller board, an alarm phone and monitoring board, a floor control board and a drive control board.

14. The passenger transportation device controller according to claim 13, wherein two of the PCBs are the elevator logic controller board and the main safety circuit board.

* * * * *